(12) United States Patent
Keesara et al.

(10) Patent No.: US 8,750,299 B2
(45) Date of Patent: Jun. 10, 2014

(54) MULTICAST TREE DISCOVERY USING 802.1AG

(75) Inventors: Srikanth Keesara, Tewksbury, MA (US); Christopher Monti, Tyngsboro, MA (US); Richard Thomas Strong, Amherst, NH (US); Deborah Ellen Fitzgerald, Acton, MA (US)

(73) Assignee: Avaya, Inc., Basking Ridge, NJ (US)

( * ) Notice: Subject to any disclaimer, the term of this patent is extended or adjusted under 35 U.S.C. 154(b) by 437 days.

(21) Appl. No.: 12/942,282

(22) Filed: Nov. 9, 2010

(65) Prior Publication Data
US 2012/0063453 A1  Mar. 15, 2012

Related U.S. Application Data

(60) Provisional application No. 61/381,536, filed on Sep. 10, 2010.

(51) Int. Cl.
*H04L 12/56* (2006.01)

(52) U.S. Cl.
USPC .......... 370/390; 370/241.1; 370/408

(58) Field of Classification Search
USPC ................. 370/241.1, 390, 408
See application file for complete search history.

(56) References Cited

U.S. PATENT DOCUMENTS

| | | | |
|---|---|---|---|
| 7,872,984 B2* | 1/2011 | Silva et al. | 370/252 |
| 2006/0250999 A1* | 11/2006 | Zeng et al. | 370/312 |
| 2009/0067358 A1* | 3/2009 | Fischer | 370/312 |
| 2009/0113070 A1* | 4/2009 | Mehta et al. | 709/238 |
| 2010/0268817 A1* | 10/2010 | Shah-Heydari | 709/224 |
| 2011/0069607 A1* | 3/2011 | Huang | 370/217 |
| 2011/0286337 A1* | 11/2011 | Olsson | 370/241.1 |

* cited by examiner

*Primary Examiner* — Dang Ton
*Assistant Examiner* — Mewale Ambaye
(74) *Attorney, Agent, or Firm* — Anderson Gorecki & Rouille LLP (57) ABSTRACT

Methods and apparatus provide for a network device(s) employing tree tracer processing of a data packet(s) and/or a response(s) in order to discover and graphically represent all the paths within a hierarchical tree of network devices for multicast traffic flows. Specifically, a first network device receives a data packet. The data packet provides a multicast target MAC address. The first network device forwards the data packet to a plurality of network devices, where each of the plurality of the network devices belong to a multicast group identified according to the multicast target MAC address. Based on receipt of the data packet, the first network device generates and transmits a first response to a source of the data packet. The first response indicates a placement of the first network device with respect to a hierarchical tree of the plurality of network devices belonging to the multicast group.

16 Claims, 6 Drawing Sheets

MULTICAST TREE DISCOVERY USING 802.1AG

PRIORITY TO PROVISIONAL APPLICATION

This U.S. Utility patent application claims the benefit of the filing date of earlier filed U.S. Provisional Application for patent having U.S. Ser. No. 61/381,536, filed Sep. 10, 2010 entitled "MULTICAST TREE DISCOVERY USING 802.1ag". The entire teaching, disclosure and contents of this provisional patent are hereby incorporated by reference herein in their entirety.

BACKGROUND

The advent of Ethernet as a metropolitan-area networks (MANs) and wide area networks technology imposes a new set of Ethernet layer operation, administration, and management (OAM) requirements on Ethernet's traditional operations, which were centered on enterprise networks only. The expansion of Ethernet technology into the domain of service providers, where networks are substantially larger and more complex than enterprise networks and the user base is wider, makes operational management of link uptime crucial. More importantly, the timeliness in isolating and responding to a failure becomes mandatory for normal day-to-day operations, and OAM translates directly to the competitiveness of the service provider.

Ethernet Connectivity Fault Management (CFM or Ethernet CFM) is an end-to-end per-service-instance OAM protocol that provides proactive connectivity monitoring, fault verification, and fault isolation for large Ethernet MANs and WANs. CFM uses standard Ethernet frames. ALL CFM frames are distinguishable by EtherType and in case of multicast frames by Media Access Control (MAC) addresses. CFM frames are sourced, terminated, processed, and relayed by bridges. Bridges that cannot interpret CFM messages forward them as normal data frames. Ethernet CFM comprises three protocols that work together to help administrators debug Ethernet networks. These are: continuity check, link trace and loopback protocols.

CFM continuity check messages are "heartbeat" messages issued periodically by MEPs. They allow MEPS to detect loss of service connectivity amongst themselves. They also allow MEPs to discover other MEPs within a domain, and allow MIPs to discover MEPs. CFM link trace messages are transmitted by a MEP on the request of the administrator to track the path (hop-by-hop) to a destination MEP. CFM link trace messages allow the transmitting node to discover vital connectivity data about the path. CFM loopback messages are transmitted by a MEP on the request of the administrator to verify connectivity to a particular maintenance point. Loopback indicates whether the destination is reachable or not; it does not allow hop-by-hop discovery of the path. It is similar in concept to the concept of a "ping" message.

BRIEF DESCRIPTION

The CFM link trace functionality (also referred to as "Linktrace") suffers from a variety of deficiencies. Specifically, Linktrace does not trace all different branches of the multicast traffic flow through a tree of network devices. Linktrace is directed only to tracing a path between two given devices as opposed to discovering all the paths, amongst a tree of network devices, starting from a root device of a multicast traffic flow. Currently, CFM (i.e. IEEE 802.1ag) enables a network operator to discover only an exact path between any two network devices.

Techniques discussed herein significantly overcome the deficiencies of conventional CFM functionalities such as those discussed above. As will be discussed further, certain specific embodiments herein are directed to a network device(s) employing tree tracer processing of a data packet(s) and/or a response(s) in order to discover and graphically represent all the paths within a hierarchical tree of network devices for multicast traffic flows.

Specifically, in various embodiments, a first network device receives a data packet (such as a CFM data packet or CFM message). The data packet provides a multicast target Media Access Control (MAC) address. The first network device forwards the data packet to a plurality of network devices, where each of the plurality of the network devices belong to a multicast group identified according to the multicast target MAC address. Based on receipt of the data packet, the first network device generates and transmits a first response to a source of the data packet. The first response indicates a placement of the first network device with respect to a hierarchical tree of the plurality of network devices belonging to the multicast group.

Additionally, each of the plurality of the network devices belonging to the multicast group will themselves generate and transmit their own response upon receipt of the data packet forwarded over by the first network device. Such responses will indicate the placement of the corresponding network device with respect to the hierarchical tree network devices belonging to the multicast group as well. Such responses will be sent back through the first network device, which will forward such responses back to a source of the data packet. Further, a graphical representation of the hierarchical tree of the network devices can be rendered based on all the responses sent back to the source of the data packet.

It is understood that, in various embodiments, the first network device can itself be a multicast group member or a transit device between multicast group members. Also, it is noted that in some embodiments, the data packet provides a multicast destination MAC address as well.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other arrangements of embodiments of the invention that are disclosed herein include software programs to perform the method embodiment steps and operations summarized above and disclosed in detail below. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc.

The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a network device(s) employing tree tracer processing, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus described herein are directed to a network device(s) employing tree tracer processing of a data packet(s) and/or a response(s) in order to discover and graphically represent all the paths within a hierarchical tree of network devices for multicast traffic flows (for example, in a Layer 2 network).

Multicast data traffic is an increasing part of the overall traffic carried by Ethernet-based networks. As a result, it is important for a network operator to be able to detect and isolate faults that affect multicast traffic flows. This requires that the network operator be able to determine, in real time, the exact path than any given multicast traffic flow uses in the network. However, multicast data traffic is handled quite differently from unicast data traffic. Multicast data traffic exercises a different set of forwarding tables, queues and other resources than unicast data traffic. Due to such differences, Linktrace is directed for real-time tracing of unicast data traffic—as opposed to multicast data traffic.

Various embodiments described herein discuss a network device(s) employing tree tracer processing of any given multicast data traffic flow in networks that use MAC address forwarding table records to deliver multicast data traffic.

As already mentioned, CFM's Linktrace functionality only allows for the tracing of a path between two given network devices—as opposed to the discovery of multiple paths from the root network device of a multicast traffic flow to all other network devices in a hierarchical tree of network devices belonging to a particular multicast group.

Currently, CFM's Linktrace functionality does not specify the use of the MAC addresses of a multicast traffic flows as the target MAC address in a CFM data packet. Also, Linktrace does not specify that a network device receives a CFM data packet and then forwards the CFM data packet along all of the different paths (i.e. links, branches) of the multicast traffic flow. Specifically, Linktrace merely specifies forwarding to only a single network device. Further, Linktrace is not directed to construction and rendering of a graphical representation of the hierarchical tree of network devices in a multicast group based on responses generated by each of the respective network devices.

Figure 1:
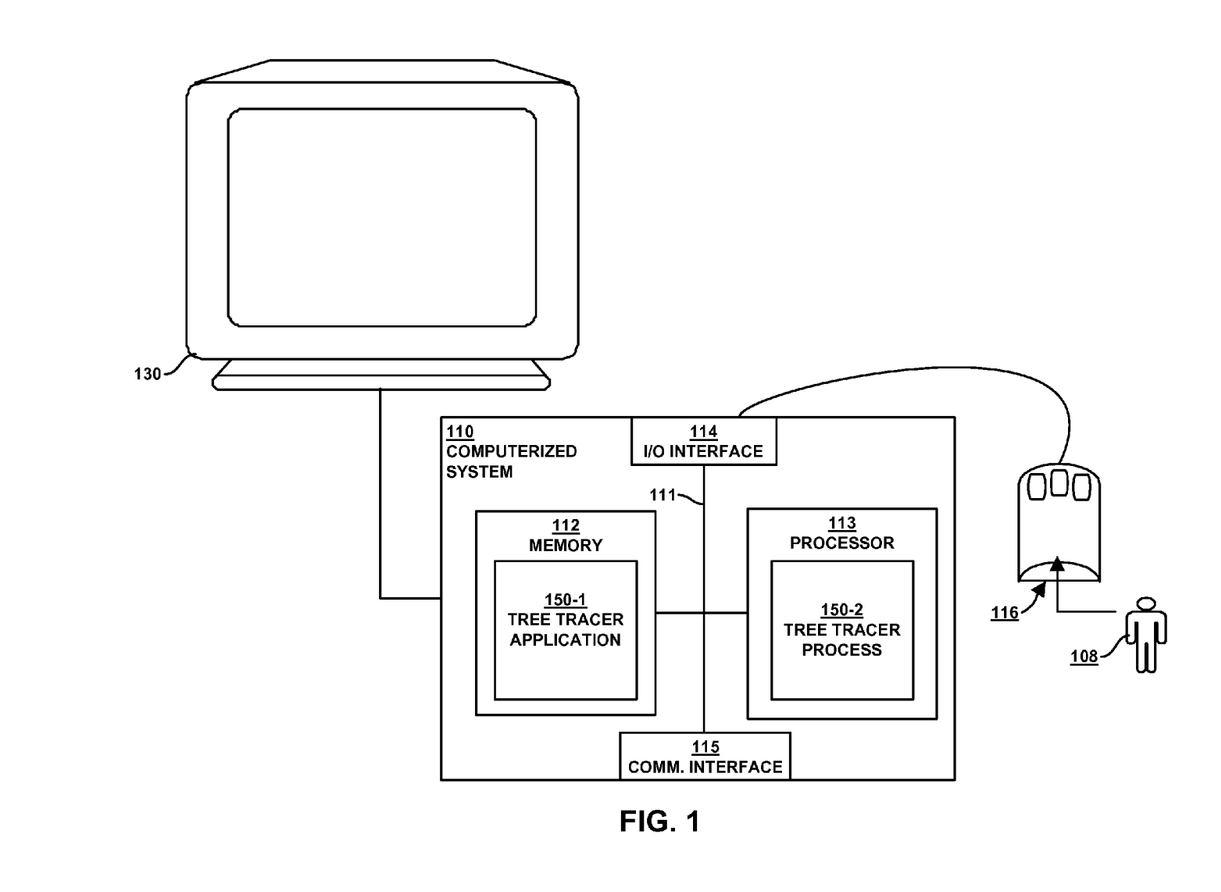
FIG. 1 is an example block diagram illustrating an architecture of a computer system that executes a tree tracer application and/or a tree tracer process according to embodiments herein.

FIG. 1 is an example block diagram illustrating an architecture of a computer system 110 (such as a network device) that executes, runs, interprets, operates or otherwise performs a tree tracer application 150-1 and/or tree tracer process 150-2 (e.g. an executing version of a tree tracer 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein. For example, computer system 110 can be a router, a switch or a field-programmable field array.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the tree tracer 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system.

As mentioned above, depending on the embodiment, the tree tracer application 150-1 and/or the tree tracer process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the tree tracer application 150-1. Execution of the tree tracer application 150-1 in this manner produces the tree tracer process 150-2. In other words, the tree tracer process 150-2 represents one or more portions or runtime instances of the tree tracer application 150-1 (or the entire application 150-1) performing or executing within or upon the processor 113 in the computerized device 110 at runtime.

The tree tracer application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the tree tracer application 150-1 can be executed on a remotely accessible computerized device via the communication interface 115.

Figure 2:
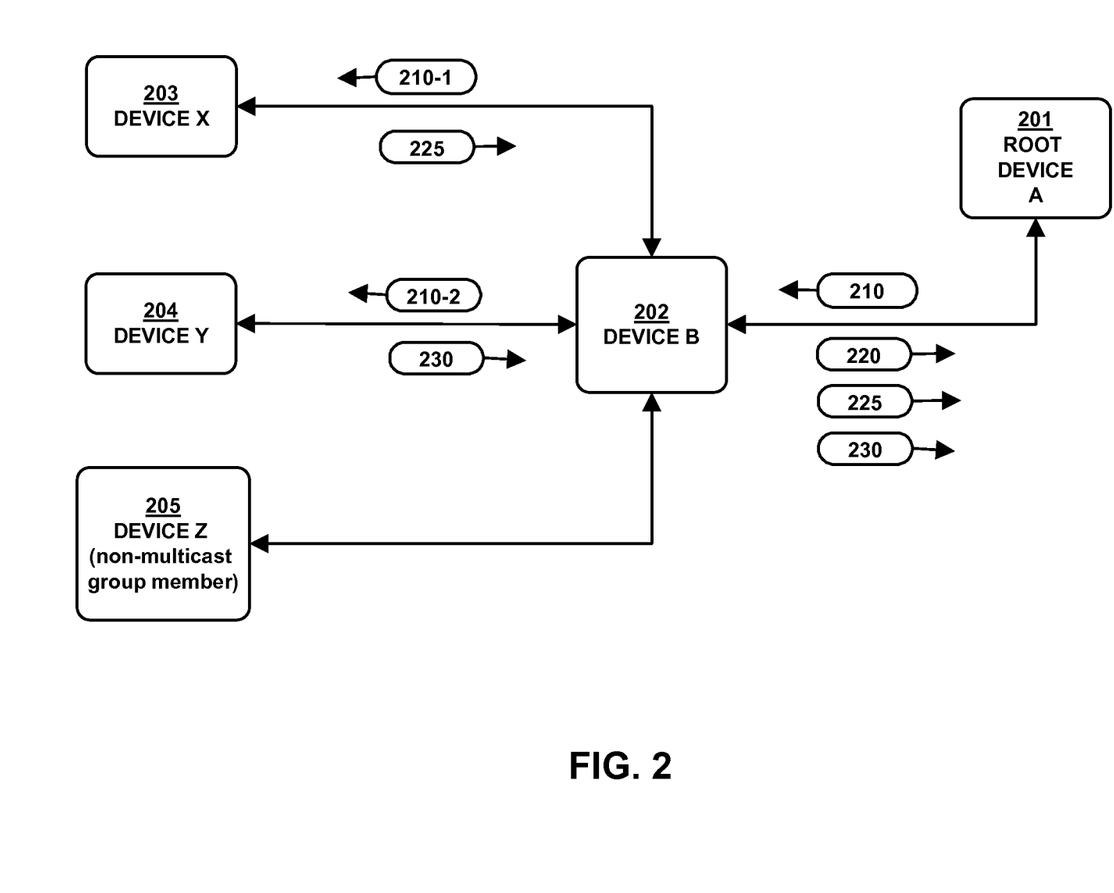
FIG. 2 is an example block diagram of network devices employing tree tracer processing according to embodiments herein.

FIG. 2 is an example block diagram of network devices employing tree tracer processing according to embodiments herein. FIG. 2 shows a plurality of network devices 201, 202, 203, 204, 205. Root Device A 201, Device X 203 and Device Y 204 are members of a multicast group, while Device Z 205 is not a member of the multicast group. It is understood that network devices 201, 202, 203, 204, 205 can each employ at any portion(s) of the tree tracer application 150-1 and tree tracer process 150-2 described herein.

Device B 202 receives a data packet 210 (such as an IEEE 802.1ag request data packet or a Linktrace Message: "LTM") from Root Device A 201. The data packet provides a multicast target MAC address. Device B determines that Root Device A 201, Device X 203 and Device Y 204 each belong to a given multicast group—while Device Z 205 does not. It is noted that "IEEE" is an abbreviation for "Institute of Electrical and Electronics Engineers."

Device B 202 forwards an instance of the data packet 210-1, 210-2 to Device X 203 and Device Y 204, respectively. In addition, Device B 202 generates and transmits a response (such as an IEEE 802.1ag reply data packet or "LTR") back to Root Device A 201. The response sent from Device B 202 indicates Device B's placement with respect to a hierarchical tree of network devices 201, 203, 204 belonging to the multicast group.

As illustrated in FIG. 2, it is noted that Device B 202 is a transit device and not a multicast group member. However, in other embodiments, Device B 202 could employ similar tree tracer processing as a multicast group member.

Both Device X 203 and Device Y 204 each respectively receive a data packet instance 210-1, 210-2. In response to receipt of a data packet instance 210-1, 210-2, Device X 203 and Device Y 204 each individually generate and transmit a response 225, 230 (such as an Linktrace Response: "LTR") through Device B 202 and back to Root Device A 201. The response 225 sent from Device X 203 indicates Device X's placement with respect to the hierarchical tree of network devices 201, 203, 204 belonging to the multicast group. The response 230 sent from Device Y 204 indicates Device Y's 204 placement with respect to the hierarchical tree of network devices 201, 203, 204 belonging to the multicast group. Root Device A 201 receives all the responses 220, 225, 230 and can construct a graphical representation of all the paths between Root Device A 201, Device B 202, Device X 203 and Device Y 204.

It is also understood that, in various embodiments, if a particular network device is not on the multicast traffic flow, but receives the data packet (i.e. "LTM"), it drops the data packet and it neither forwards the data packet nor does it generate and transmit a response (i.e. "LTR") to the data packet.

While FIG. 2 illustrates three responders (Device B 202, Device X 203 and Device Y 204), other embodiments are not limited to only three responders. Rather, Forwarding LTMs and generating LTRs can be performed by any number of network devices depending on however wide and deep the hierarchical tree of network devices for a particular multicast group.

Figure 3:
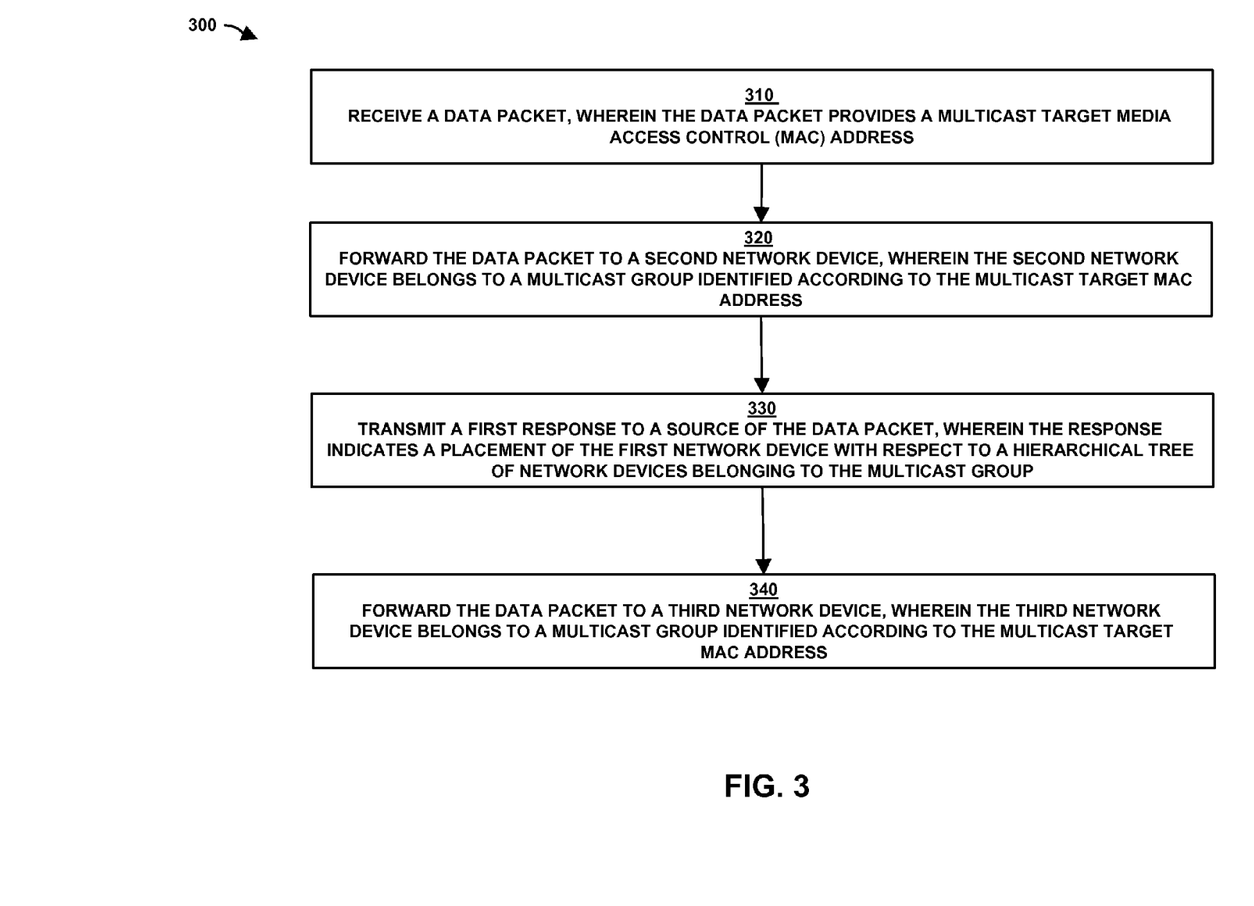
FIG. 3 is a flowchart of an example of steps performed at a network device implementing at least a portion of tree tracer processing according to embodiments herein.
Figure 4:
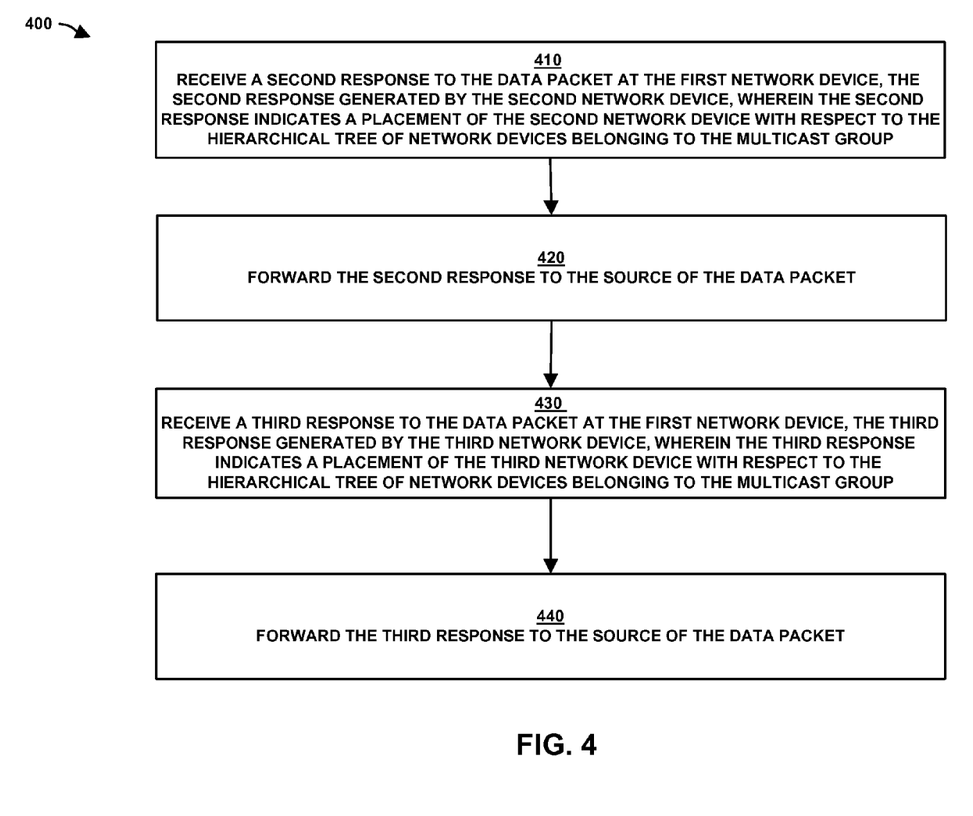
FIG. 4 is a flowchart of an example of steps performed at a network device implementing at least a portion of tree tracer processing according to embodiments herein.
Figure 5:
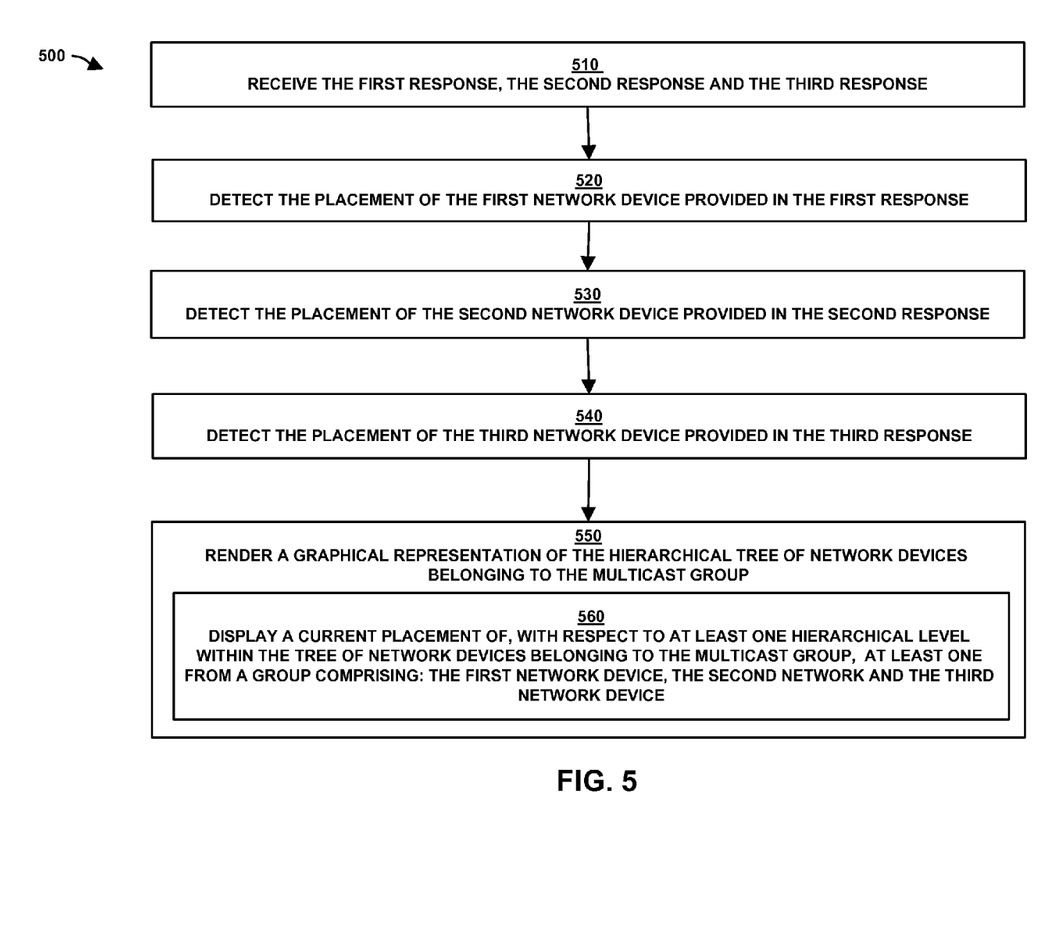
FIG. 5 is a flowchart of an example of steps performed at a network device implementing at least a portion of tree tracer processing according to embodiments herein.

FIG. 3 through FIG. 5 illustrate various embodiments of a network device(s) implementing at least a portion of the tree tracer process 150-2 (and tree tracer application 150-1) as described herein. The rectangular elements in flowcharts 300, 400, 500 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 300, 400, 500 do not necessarily depict the syntax of any particular programming language. Rather, flowcharts 300, 400, 500 illustrate the functional information one of ordinary skill in the art requires to fabricate circuits or to generate computer software to perform the processing required in accordance with the present invention.

FIG. 3 is a flowchart 300 of an example of steps performed at a network device implementing at least a portion of tree tracer processing according to embodiments herein.

At step 310, the network device 202 receives a data packet, where data packet provides a multicast target Media Access Control (MAC) address. It is also understood, that in various embodiment, the data packet also provides a multicast destination MAC address.

At step 320, the network device 202 forwards the data packet to a second network device, where the second network device belongs to a multicast group identified according to the multicast target MAC address.

At step 330, the network device 202 transmits a first response to a source of the data packet, where the response indicates a placement of the first network device with respect to a hierarchical tree of network devices belonging to the multicast group. It is noted that, in various embodiments, the network device 202 is a transit device located between a plurality network devices in the hierarchical tree of network devices belonging to the multicast group. However, the transit device is orientated outside of the hierarchical tree of network devices belonging to the multicast group.

At step 340, the network device 202 forwards the data packet to a third network device, wherein the third network device belongs to a multicast group identified according to the multicast target MAC address.

FIG. 4 is a flowchart 400 of an example of steps performed at a network device implementing at least a portion of tree tracer processing according to embodiments herein.

At step 410, the network device 202 receives a second response to the data packet at the first network device. The second response indicates a placement of the second network device with respect to the hierarchical tree of network devices belonging to the multicast group. In other words, the second response includes data describing at which hierarchical level the second network device currently resides. The second response is generated by the second network device upon receipt of the data packet (which was forwarded by the network device 202).

At step 420, the network device 202 forwards the second response to the source of the data packet.

At step 430, the network device 202 receives a third response to the data packet at the first network device. The third response indicates a placement of the third network device with respect to the hierarchical tree of network devices belonging to the multicast group. Specifically, the third response includes data describing at which hierarchical level the third network currently resides. The third response is generated by the third network device upon receipt of the data packet (which was forwarded by the network device 202).

At step 440, the network device 202 forwards the third response to the source of the data packet.

FIG. 5 is a flowchart 500 of an example of steps performed at a network device implementing at least a portion of tree tracer processing according to embodiments herein. It is noted that the following discussion of flowchart 500 is described with respect to a root network device 201. However, in other embodiments, the steps in flowchart can be performed by any network device 201 or computer system.

At step 510, the root network device 201 of the hierarchical tree of network devices belonging to the multicast group receives the first response, the second response and the third response.

At step 520, the network device 201 detects the placement of the first network device provided in the first response.

At step 530, the network device 201 detects the placement of the second network device provided in the second response.

At step 540, the network device 201 detects the placement of the third network device provided in the third response.

At step 550, the network device 201 renders a graphical representation of the hierarchical tree of network devices belonging to the multicast group.

At step 560, the network device 201 displaying a current placement of, with respect to at least one hierarchical level within the tree of network devices belonging to the multicast group, at least one from a group comprising: the first network device, the second network and the third network device.

For example, the graphical representation of the hierarchical tree of network devices is rendered on displayed on a display screen. The graphical representation provides an illustration of the network devices that sent responses back to the root network device, as well as the available paths for multicast traffic flow throughout the hierarchical tree of network devices.

Figure 6:
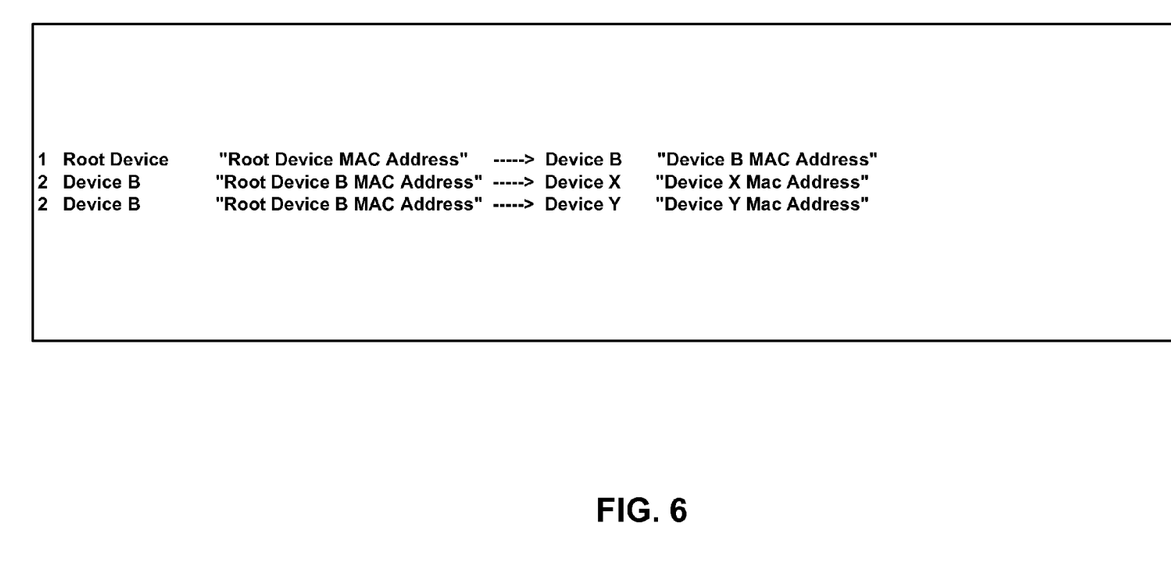
FIG. 6 is a block diagram example of a graphical representation of a hierarchical tree of network devices according to embodiments herein.

FIG. 6 is a block diagram example of a graphical representation of a hierarchical tree of network devices according to embodiments herein. The graphical representation in FIG. 6 is related to the multicast traffic described in FIG. 2. It is noted that FIG. 6 is output requested by and displayed to a user which can be accessed via Simple Network Management Protocol (SNMP) from an offline network management tool.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
receiving a data packet at a first network device, the data packet providing a multicast target Media Access Control (MAC) address;
forwarding the data packet to a second network device, the second network device belonging to a multicast group identified according to the multicast target MAC address;
transmitting a first response to a source of the data packet, wherein the response indicates a placement of the first network device with respect to a hierarchical tree of network devices belonging to the multicast group;
receiving a second response to the data packet at the first network device, the second response generated by the second network device, wherein the second response indicates a placement of the second network device with respect to the hierarchical tree of network devices belonging to the multicast group, wherein the first network device comprises a transit device located between a plurality network devices in the hierarchical tree of network devices belonging to the multicast group, wherein the transit device is orientated outside of the hierarchical tree of network devices belonging to the multicast group; and
rendering a graphical representation of the hierarchical tree of the network devices including displaying a current placement of said first or second network device with respect to at least one hierarchical level.

2. The method as in claim 1, comprising:
forwarding the data packet to a third network device, the third network device belonging to the multicast group identified according to the multicast target MAC address.

3. The method as in claim 2 comprising:
receiving a third response to the data packet at the first network device, the third response generated by the third network device, wherein the third response indicates a placement of the third network device with respect to the hierarchical tree of network devices belonging to the multicast group; and
forwarding the third response to the source of the data packet.

4. The method as in claim 3, comprising:
wherein receiving the data packet includes: receiving an Institute of Electrical and Electronics Engineers (IEEE) 802.1ag request data packet;
wherein transmitting the first response includes: forwarding a first IEEE 802.1ag reply data packet generated by the first network device;
wherein forwarding the second response includes: forwarding a second IEEE 802.1ag reply data packet generated by the second network device; and
wherein forwarding the third response includes: forwarding a third IEEE 802.1ag reply data packet generated by the third network device.

5. The method as in claim 3, comprising:
receiving the first response, the second response and the third response at the source of the data packet, the source of the data packet comprising a root network device of the hierarchical tree of network devices belonging to the multicast group;
detecting the placement of the first network device provided in the first response;
detecting the placement of the second network device provided in the second response;
detecting the placement of the third network device provided in the third response; and
rendering a graphical representation of the hierarchical tree of network devices belonging to the multicast group.

6. The method as in claim 4, wherein rendering the graphical representation of the hierarchical tree of network devices belonging to the multicast group includes:
displaying a current placement of, with respect to at least one hierarchical level within the tree of network devices belonging to the multicast group, at least one from a group comprising: the first network device, the second network and the third network device.

7. The method as in claim 1, wherein receiving a data packet includes: receiving the data packet at a transit device located between a plurality network devices in the hierarchical tree of network devices belonging to the multicast group, wherein the transit device is orientated outside of the hierarchical tree of network devices belonging to the multicast group.

8. A non-transitory computer readable storage medium comprising executable instructions encoded thereon operable on a computerized device to perform processing comprising:

instructions for receiving a data packet at a first network device, the data packet providing a multicast target Media Access Control (MAC) address;

instructions for forwarding the data packet to a second network device, the second network device belonging to a multicast group identified according to the multicast target MAC address;

instructions for transmitting a first response to a source of the data packet, wherein the response indicates a placement of the first network device with respect to a hierarchical tree of network devices belonging to the multicast group;

instructions for receiving a second response to the data packet at the first network device, the second response generated by the second network device, wherein the second response indicates a placement of the second network device with respect to the hierarchical tree of network devices belonging to the multicast group, wherein the first network device comprises a transit device located between a plurality network devices in the hierarchical tree of network devices belonging to the multicast group, wherein the transit device is orientated outside of the hierarchical tree of network devices belonging to the multicast group; and instructions for rendering a graphical representation of the hierarchical tree of the network devices including displaying a current placement of said first or second network device with respect to at least one hierarchical level.

9. The non-transitory computer readable storage medium as in claim 8, comprising:

instructions for forwarding the data packet to a third network device, the third network device belonging to a multicast group identified according to the multicast target MAC address.

10. The non-transitory computer readable storage medium as in claim 9, comprising:

instructions for receiving a third response to the data packet at the first network device, the third response generated by the third network device, wherein the third response indicates a placement of the third network device with respect to the hierarchical tree of network devices belonging to the multicast group; and instructions for forwarding the third response to the source of the data packet.

11. The non-transitory computer readable storage medium as in claim 10, comprising:

wherein the instructions for receiving the data packet include: instructions for receiving an IEEE 802.1ag request data packet;

wherein the instructions for transmitting the first response include: instructions for forwarding a first IEEE 802.1ag reply data packet generated by the first network device;

wherein the instructions for forwarding the second response include: instructions for forwarding a second IEEE 802.1ag reply data packet generated by the second network device; and wherein the instructions for forwarding the third response includes: instructions for forwarding a third IEEE 802.1ag reply data packet generated by the third network device.

12. The non-transitory computer readable storage medium as in claim 10, comprising:

instructions for receiving the first response, the second response and the third response at the source of the data packet, the source of the data packet comprising a root network device of the hierarchical tree of network devices belonging to the multicast group;

instructions for detecting the placement of the first network device provided in the first response;

instructions for detecting the placement of the second network device provided in the second response;

instructions for detecting the placement of the third network device provided in the third response; and instructions for rendering a graphical representation of the hierarchical tree of network devices belonging to the multicast group.

13. The non-transitory computer readable storage medium as in claim 12, wherein the instructions for rendering the graphical representation of the hierarchical tree of network devices belonging to the multicast group include:

instructions for displaying a current placement of, with respect to at least one hierarchical level within the tree of network devices belonging to the multicast group, at least one from a group comprising: the first network device, the second network and the third network device.

14. The non-transitory computer readable storage medium as in claim 8, wherein the instructions for receiving a data packet include: instructions for receiving the data packet at a transit device located between a plurality network devices in the hierarchical tree of network devices belonging to the multicast group, wherein the transit device is orientated outside of the hierarchical tree of network devices belonging to the multicast group.

15. A computer system comprising:

a processor;

a memory unit that stores instructions associated with an application executed by the processor; and an interconnect coupling the processor and the memory unit, enabling the computer system to execute the application and perform operations of:

receiving a data packet at a first network device, the data packet providing a multicast target Media Access Control (MAC) address;

forwarding the data packet to a second network device, the second network device belonging to a multicast group identified according to the multicast target MAC address;

transmitting a first response to a source of the data packet, wherein the response indicates a placement of the first network device with respect to a hierarchical tree of network devices belonging to the multicast group; and receiving a second response to the data packet at the first network device, the second response generated by the second network device, wherein the second response indicates a placement of the second network device with respect to the hierarchical tree of network devices belonging to the multicast group, wherein the first network device comprises a transit device located between a plurality network devices in the hierarchical tree of network devices belonging to the multicast group, wherein the transit device is orientated outside of the hierarchical tree of network devices belonging to the multicast group.

16. The computer system of claim 15 further comprising performing the operations of rendering a graphical representation of the hierarchical tree of the network devices including displaying a current placement of said first or second network device with respect to at least one hierarchical level.

* * * * *